US011162630B2

(12) United States Patent
Deka et al.

(10) Patent No.: US 11,162,630 B2
(45) Date of Patent: Nov. 2, 2021

(54) INSULATING CORE MATERIAL HAVING COATED INSULATED SPHERES AND A PROCESS FOR MAKING THE INSULATING CORE MATERIAL

(71) Applicant: WHIRLPOOL CORPORATION, Benton Harbor, MI (US)

(72) Inventors: Lakshya J. Deka, Mishawaka, IN (US); Eric J. Vasko, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 173 days.

(21) Appl. No.: 16/308,535

(22) PCT Filed: Oct. 17, 2016

(86) PCT No.: PCT/US2016/057271
§ 371 (c)(1),
(2) Date: Dec. 10, 2018

(87) PCT Pub. No.: WO2018/074986
PCT Pub. Date: Apr. 26, 2018

(65) Prior Publication Data
US 2019/0145572 A1 May 16, 2019

(51) Int. Cl.
*F16L 59/04* (2006.01)
*F16L 59/065* (2006.01)
(Continued)

(52) U.S. Cl.
CPC .............. *F16L 59/04* (2013.01); *C03C 15/00* (2013.01); *C03C 17/42* (2013.01); *F16L 59/065* (2013.01);
(Continued)

(58) Field of Classification Search
CPC ......... F16L 59/04; F16L 59/065; F25D 23/06; F25D 23/065; F25D 2201/14;
(Continued)

(56) References Cited

U.S. PATENT DOCUMENTS 2,806,509 A    9/1957  Bozzacco et al.
3,510,392 A *  5/1970  D'Eustachio .............. C08J 9/32
                                                    428/221

(Continued)

FOREIGN PATENT DOCUMENTS

EP          0645576        3/1995
EP          3519373        8/2019
(Continued)

*Primary Examiner* — David Sample
*Assistant Examiner* — Donald M Flores, Jr.
(74) *Attorney, Agent, or Firm* — Price Heneveld LLP

(57) ABSTRACT

An insulating core material for a refrigerating appliance includes a plurality of insulating glass spheres, wherein a plurality of interstitial spaces are defined between at least a portion of the insulating glass spheres of the plurality of glass spheres. A coating material is applied at least to the outer surface of the insulating glass spheres, wherein the coating material modifies the outer surface to define a retaining outer surface of each insulating glass sphere of the plurality of glass spheres. A secondary insulating material is combined with the plurality of insulating glass spheres, wherein the secondary insulating material is at least partially retained by the retaining outer surfaces of the insulating glass spheres to occupy the plurality of interstitial spaces.

18 Claims, 11 Drawing Sheets

(51) Int. Cl.
    *F25D 23/06*     (2006.01)
    *C03C 17/42*     (2006.01)
    *C03C 15/00*     (2006.01)

(52) U.S. Cl.
    CPC ........... *F25D 23/06* (2013.01); *F25D 23/065* (2013.01); *C03C 2218/112* (2013.01); *C03C 2218/15* (2013.01); *C03C 2218/31* (2013.01); *F25D 2201/122* (2013.01); *F25D 2201/14* (2013.01); *Y02B 40/00* (2013.01); *Y10T 428/2996* (2015.01)

(58) Field of Classification Search
    CPC . F25D 2201/122; F25D 23/062; C03C 15/00; C03C 17/42; C03C 2218/112; C03C 2218/15; C03C 2218/31; Y02B 40/00; Y02W 30/91; B29L 2031/7622; C08J 9/32; B29C 70/66; C04B 38/08; C04B 2111/28; C04B 38/0038; C04B 14/064; C04B 14/066; C04B 14/24; C04B 14/305; C04B 14/42; C04B 18/146; C04B 20/1018; C04B 30/02; C04B 2103/56; Y10T 428/2996
    See application file for complete search history.

(56) References Cited

U.S. PATENT DOCUMENTS

| | | | |
|---|---|---|---|
| 4,623,390 A | 11/1986 | Delmonico | |
| 5,665,787 A | 9/1997 | Nowak et al. | |
| 6,221,456 B1 * | 4/2001 | Pogorski | E04B 1/803 |
| | | | 428/69 |
| 6,955,778 B2 | 10/2005 | Huntemann | |
| 8,343,400 B2 | 1/2013 | Cordts et al. | |
| 8,834,758 B2 | 9/2014 | Endle et al. | |
| 9,176,140 B2 | 11/2015 | Asefa et al. | |
| 9,393,449 B2 | 7/2016 | Endle et al. | |
| 2008/0135245 A1 * | 6/2008 | Smith | C04B 35/62886 |
| | | | 166/280.2 |
| 2011/0104473 A1 | 5/2011 | Tippur et al. | |
| 2013/0015389 A1 | 1/2013 | Torres-Aranda, Jr. | |
| 2013/0344337 A1 | 12/2013 | Qi et al. | |
| 2014/0033953 A1 | 2/2014 | Kim | |
| 2016/0083548 A1 | 3/2016 | Torres-Aranda | |
| 2016/0152513 A1 | 6/2016 | Morris | |
| 2019/0144343 A1 * | 5/2019 | Deka | C04B 38/009 |
| | | | 428/76 |

FOREIGN PATENT DOCUMENTS

| | | |
|---|---|---|
| JP | 4303674 | 7/2009 |
| WO | 9603555 | 2/1996 |
| WO | 02102887 | 12/2002 |
| WO | 03072684 | 9/2003 |
| WO | 03097227 | 11/2003 |
| WO | 2006005119 | 1/2006 |
| WO | 2008018966 | 2/2008 |
| WO | 2012134679 | 10/2012 |
| WO | 2013010022 | 1/2013 |
| WO | 2015009461 | 1/2015 |

* cited by examiner

INSULATING CORE MATERIAL HAVING COATED INSULATED SPHERES AND A PROCESS FOR MAKING THE INSULATING CORE MATERIAL

FIELD OF THE DEVICE

The device is in the field of insulation materials for refrigerating appliances, and more specifically, an insulating core material for inclusion within a vacuum insulated structure of an appliance.

SUMMARY

In at least one aspect, an insulating core material for a refrigerating appliance includes a plurality of insulating glass spheres, wherein a plurality of interstitial spaces are defined between at least a portion of the insulating glass spheres of the plurality of glass spheres. A coating material is applied at least to the outer surface of the insulating glass spheres, wherein the coating material modifies the outer surface to define a retaining outer surface of each insulating glass sphere of the plurality of glass spheres. A secondary insulating material is combined with the plurality of insulating glass spheres, wherein the secondary insulating material is at least partially retained by the retaining outer surfaces of the insulating glass spheres to occupy the plurality of interstitial spaces.

In at least another aspect, an insulating core material for a refrigerating appliance includes a plurality of insulating glass spheres, each insulating glass sphere of the plurality of insulating glass spheres defining an outer surface, wherein the outer surface of each insulating glass sphere defines a plurality of interstitial spaces. A textured surface is defined within the outer surface of each insulating glass sphere, wherein the textured surface defines a retaining mechanism of each insulating glass sphere of the plurality of insulating glass spheres. A secondary insulating material is combined with the plurality of insulating glass spheres, wherein the secondary insulating material is at least partially retained by the retaining mechanism of the insulating glass spheres to occupy the plurality of interstitial spaces.

In at least another aspect, a method for forming an insulating core material for an appliance includes disposing a plurality of insulating glass spheres within a drum, disposing a coating material in the drum, rotating the drum to mix the plurality of glass spheres and the coating material to modify an outer surface of the insulating glass spheres to define a retaining outer surface of each insulating glass sphere, disposing a secondary insulating material into the drum and mixing the secondary insulating material with the insulating glass spheres having the retaining outer surfaces, wherein the secondary insulating material is retained by the retaining outer surfaces to define the insulating core material.

In at least another aspect, a method for forming an insulating core material for an appliance includes disposing a plurality of insulating glass spheres within a drum, defining a textured surface within an outer surface of each insulating glass sphere, thereby creating a retaining mechanism with respect to each insulating glass sphere, disposing a secondary insulating material into the drum and mixing the secondary insulating material with the insulating glass spheres having the retaining mechanism. The secondary insulating material is retained by the retaining mechanism to define the insulating core material.

These and other features, advantages, and objects of the present device will be further understood and appreciated by those skilled in the art upon studying the following specification, claims, and appended drawings.

DETAILED DESCRIPTION OF EMBODIMENTS

Figure 1:
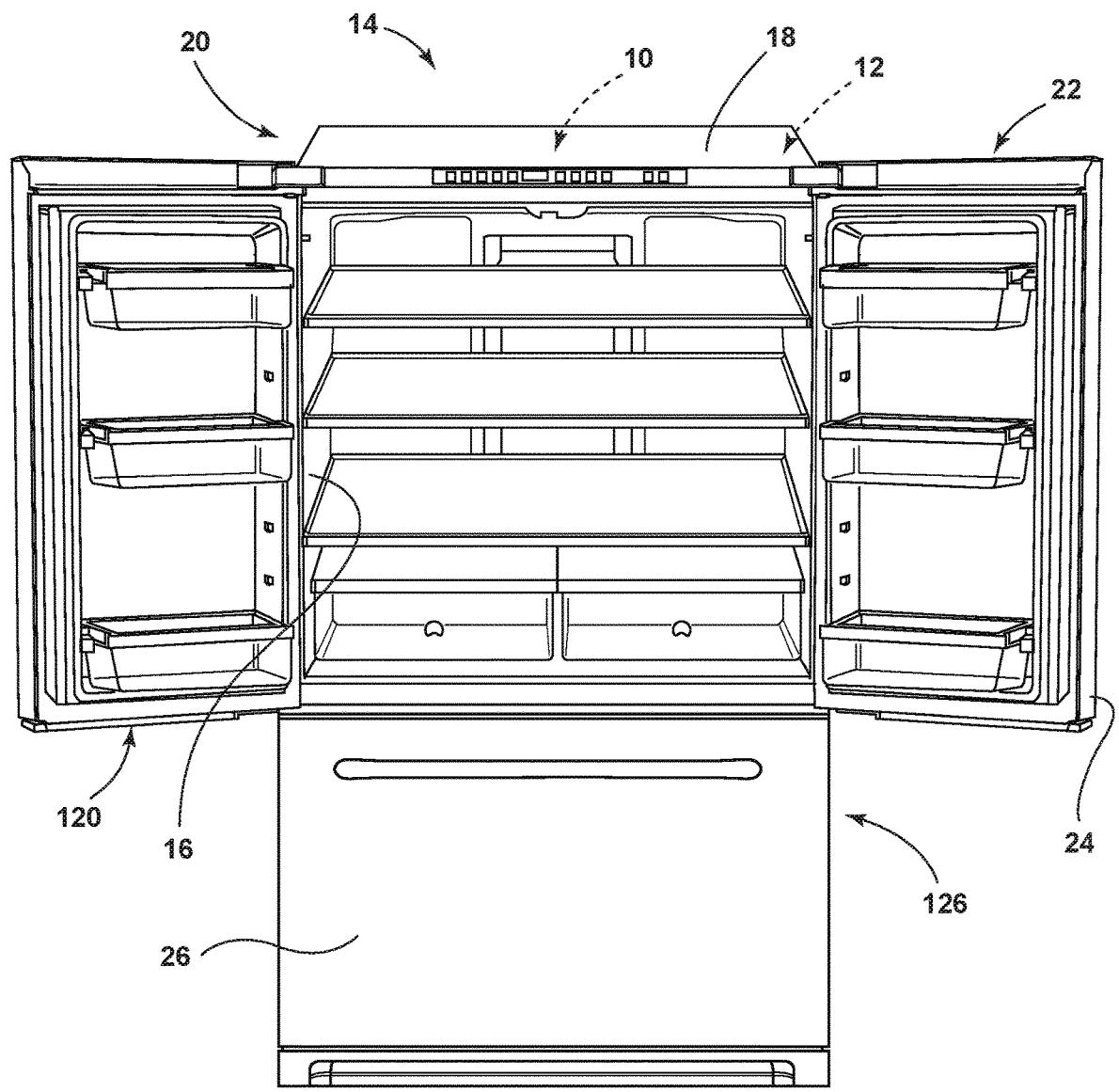
FIG. 1 is a front elevational view of an appliance incorporating an aspect of the insulating core material within an insulating cavity of the structural cabinet.
Figure 2:
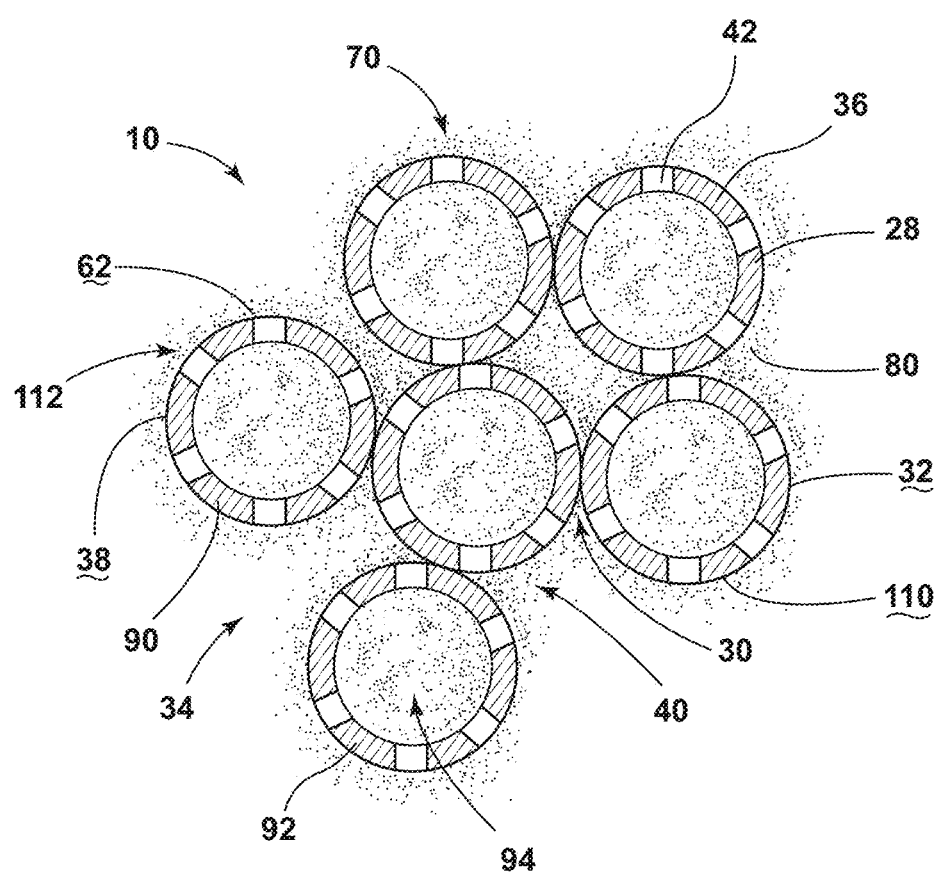
FIG. 2 is a schematic diagram illustrating an aspect of the insulating core material incorporating coated glass spheres.
Figure 3:
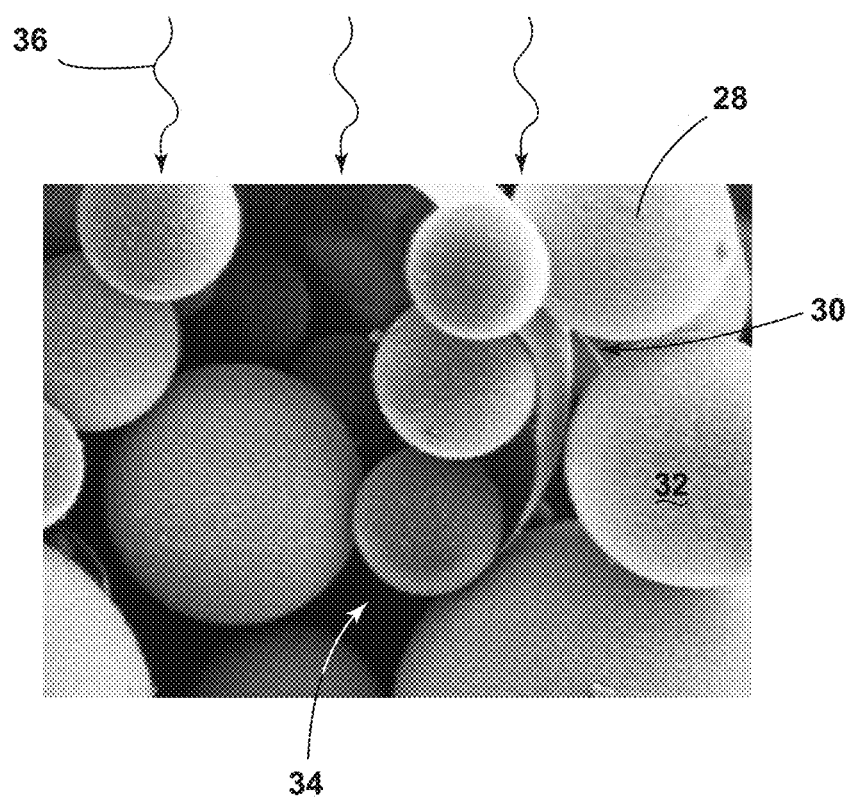
FIG. 3 is an enlarged photograph showing the glass spheres before being coated with an aspect of the coating material.
Figure 4:
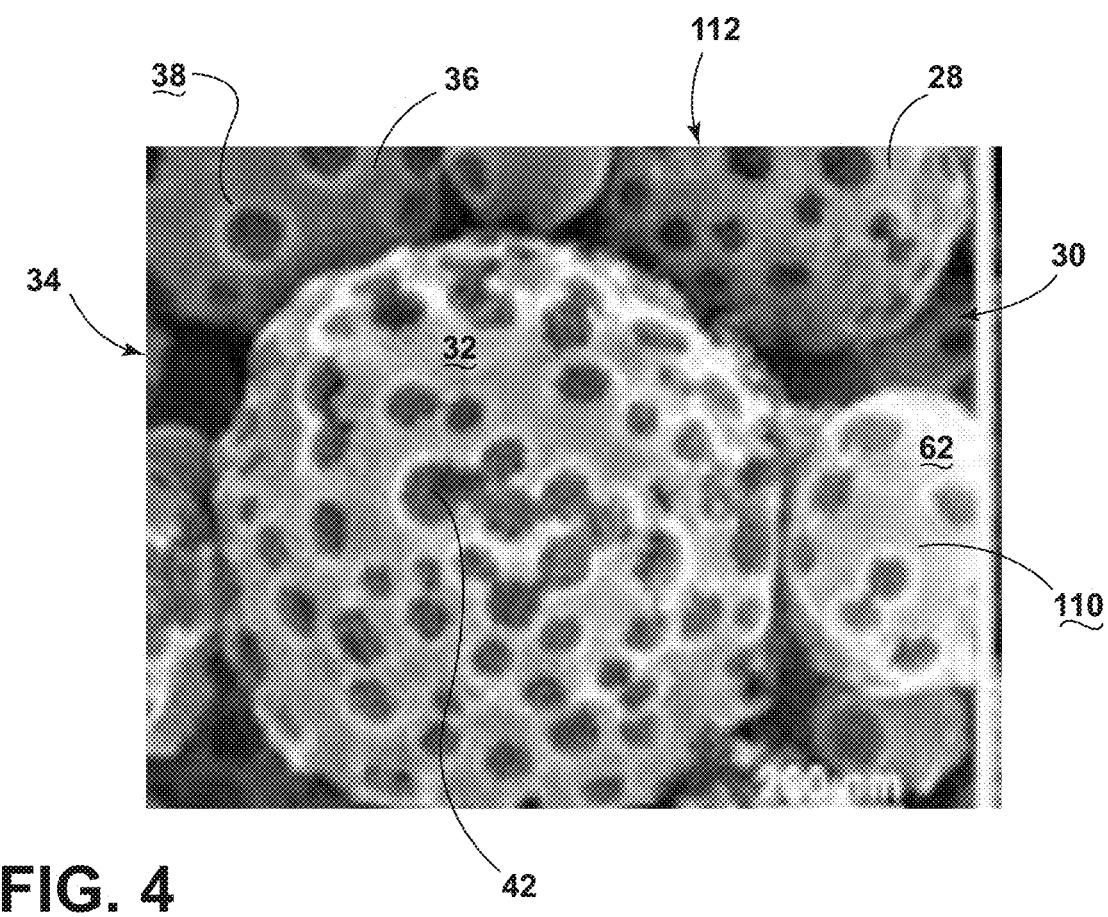
FIG. 4 is an enlarged photograph illustrating an aspect of the glass spheres after the coating material has been applied to create a textured surface defined within the outer surface of each of the insulating glass spheres.
Figure 5:
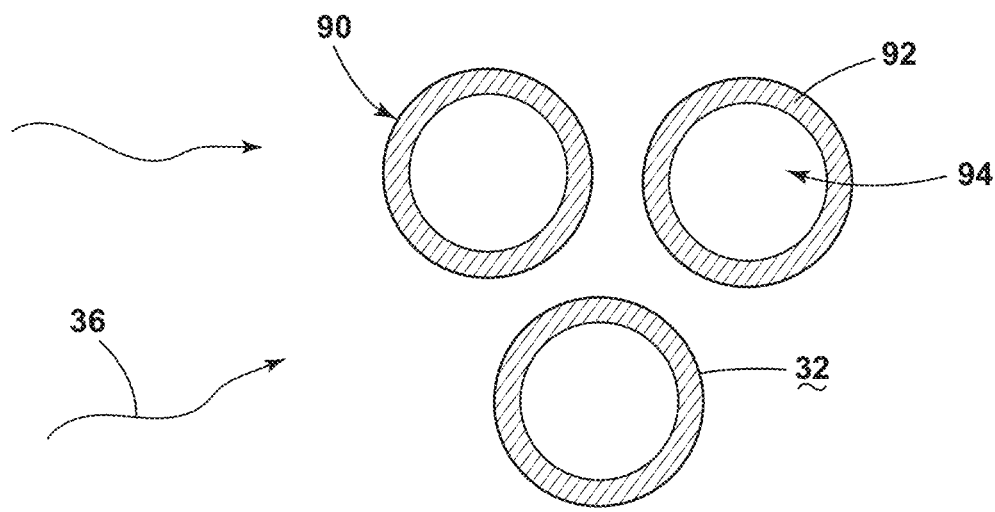
FIG. 5 is a schematic diagram illustrating an aspect of the insulating glass spheres before the coating material is applied.
Figure 6:
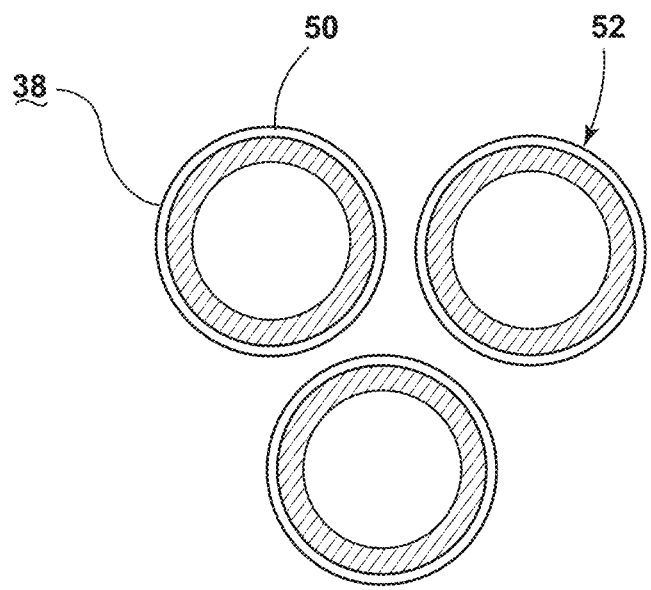
FIG. 6 is a schematic diagram illustrating the insulating glass spheres of FIG. 5 after the coating material has been applied to define the textured surface.
Figure 7:
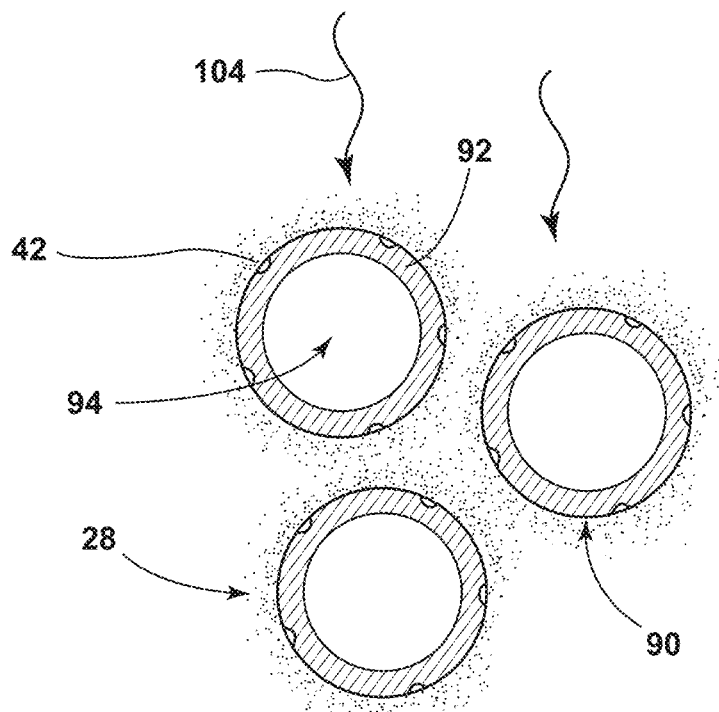
FIG. 7 is a schematic diagram illustrating an aspect of the insulating core material showing a secondary insulating material extending around but not within the insulating glass spheres.
Figure 8:
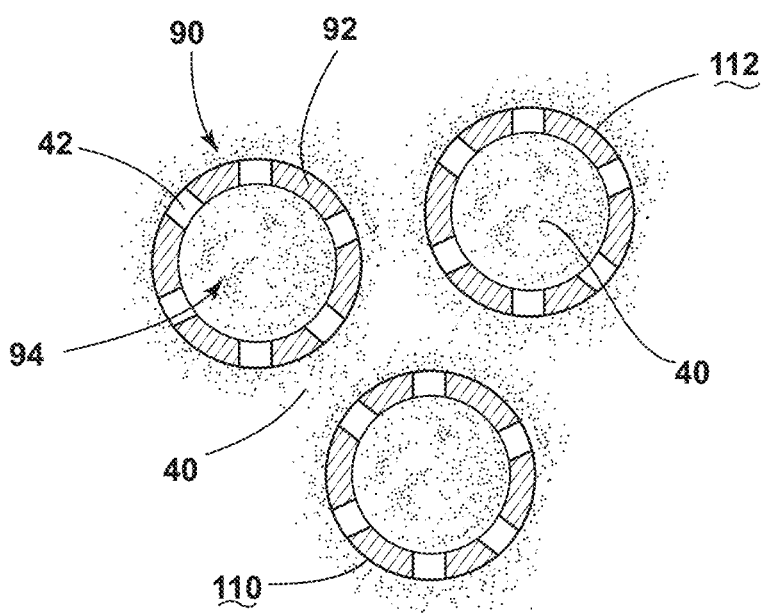
FIG. 8 is a schematic diagram illustrating an aspect of the insulating core material showing a secondary insulating material extending around and within the insulating glass spheres.
Figure 9:
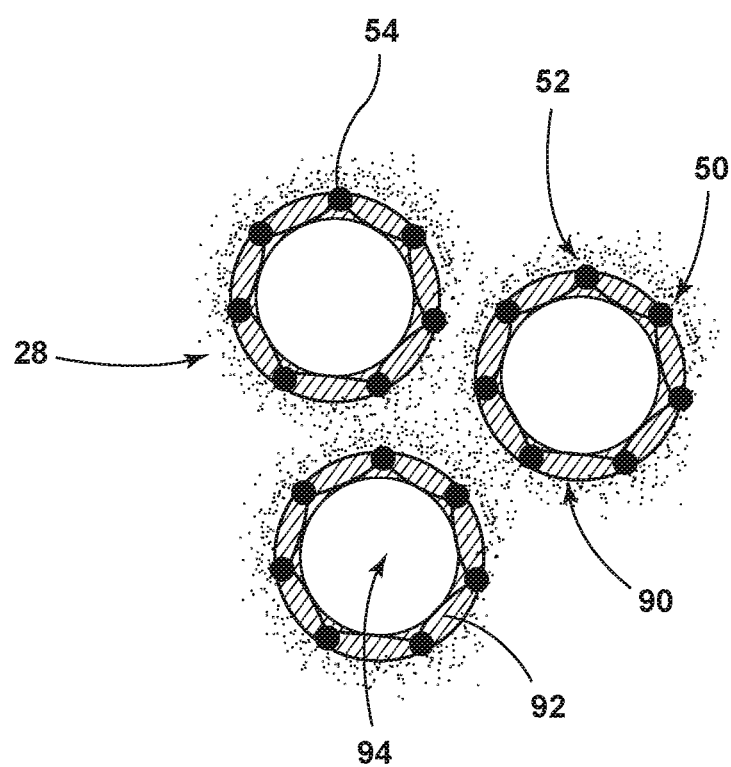
FIG. 9 is a schematic diagram illustrating an aspect of the insulating core material showing a binder combined with the textured surface of the insulating glass spheres and the secondary insulating material disposed around the insulating glass spheres.
Figure 10:
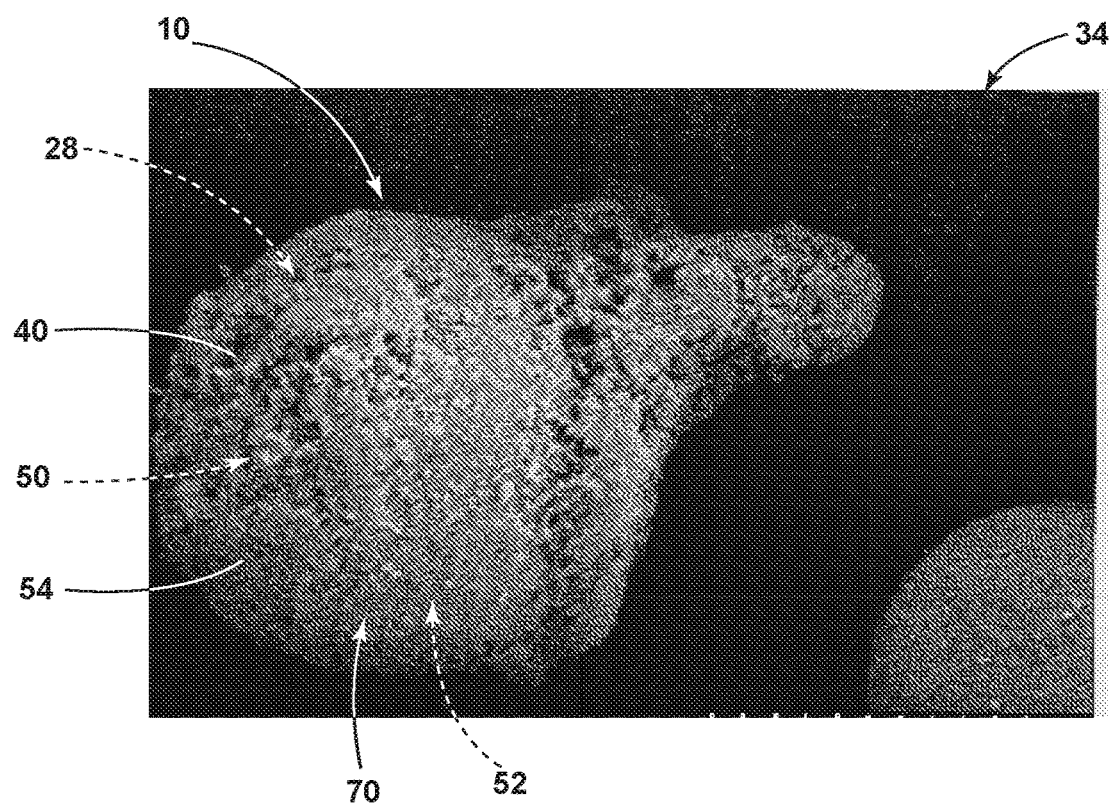
FIG. 10 is an enlarged photograph illustrating an aspect of the insulating core material with the secondary insulating material adhered to the coated insulating glass spheres having the textured surface.
Figure 11:
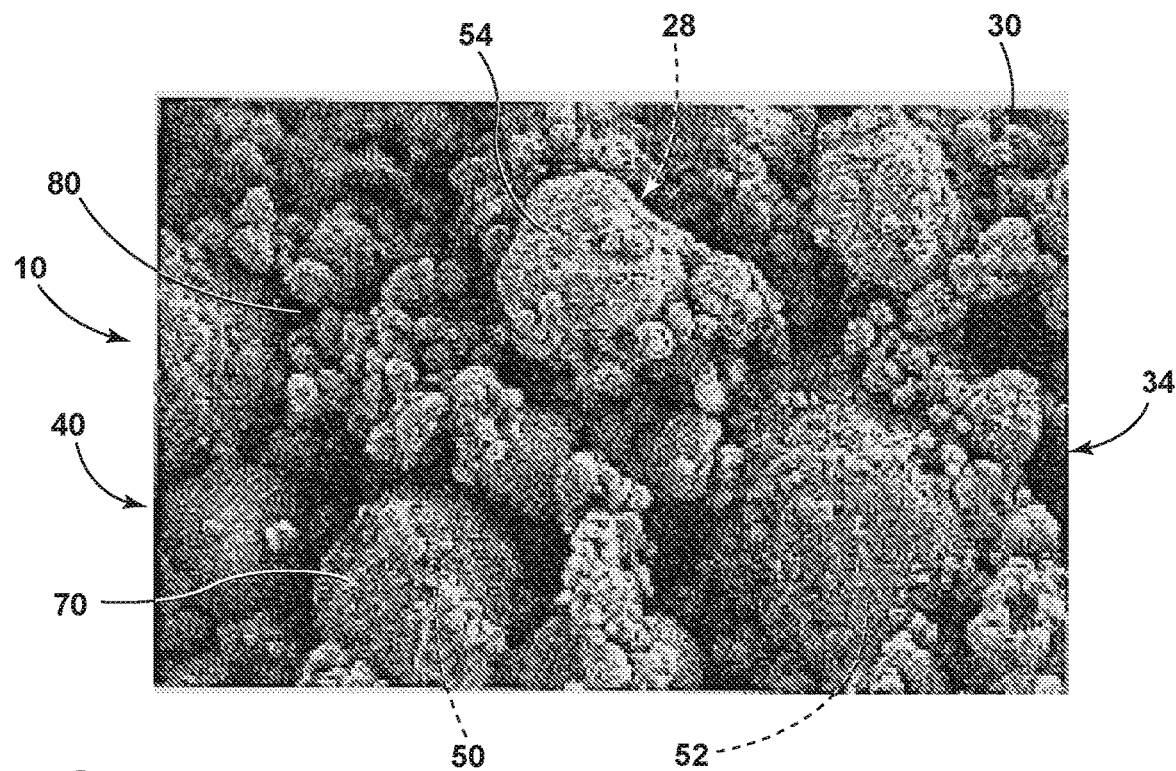
FIG. 11 is an enlarged photograph illustrating an aspect of the insulating core material with the secondary insulating material disposed within the insulating glass spheres having the textured surface.
Figure 12:
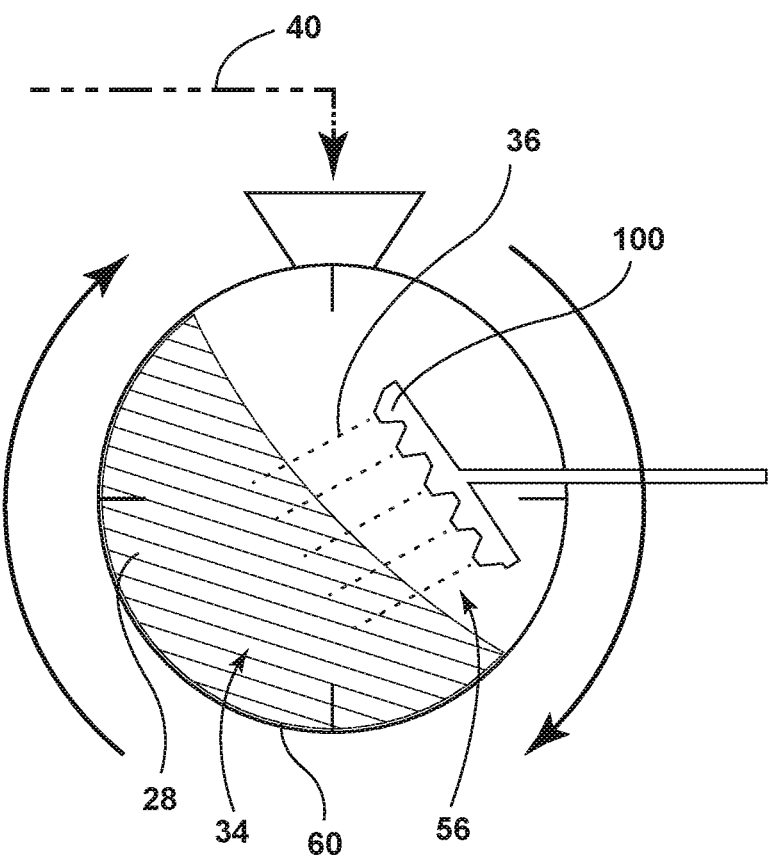
FIG. 12 is a schematic diagram illustrating an aspect of the rotating drum for applying the coating material to the insulating glass spheres via fluid jets injected into the rotating drum.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-14, reference numeral 10 generally refers to an insulating core material that can be disposed within an insulating cavity 12 of an appliance 14. The insulating core material 10 is typically disposed within the insulating cavity 12 that is defined between an inner liner 16 and an outer wrapper 18 that are connected to form a structural cabinet 20 for an appliance 14. The insulating core material 10 can also be disposed within an insulating cavity 12 defined within various operable panels 22 of the appliance 14. Such operable panels 22 can include, but are not limited to, a rotationally operable door panel 24, a slidable drawer panel 26, and other similar operable panels 22. It is contemplated that the structural cabinet 20 having the insulating cavity 12 for receiving the insulating core material 10 can be any one of various appliances 14. Such appliances 14 can include, but are not limited to, refrigerators, freezers, coolers, ovens, other heating appliances, laundry appliances, water heaters, furnaces, dishwashers, and other similar appliances 14 and fixtures that may be found in residential and/or commercial settings.

Referring again to FIGS. 1-14, the insulating core material 10 can include a plurality of insulating glass spheres 28. It is contemplated that a plurality of interstitial spaces 30 can be defined between at least a portion of the insulating glass spheres 28. Typically, the spherical configuration of the insulating glass spheres 28 provides for minimal surface-to-surface contact between adjacent insulating glass spheres 28 such that each insulating glass sphere 28 may define a plurality of interstitial spaces 30 around the outer surface 32 of each insulating glass sphere 28. Collectively, the plurality of interstitial spaces 30 can define an interstitial volume 34 that defines the space outside of and around each of the insulating glass spheres 28. A coating material 36 is applied to at least the outer surface 32 of the insulating glass spheres 28. It is contemplated that the coating material 36 can modify the outer surface 32 of each insulating glass sphere 28 to define a retaining outer surface 38 of each insulating glass sphere 28 of the plurality of insulating glass spheres 28. A secondary insulating material 40 can be combined with a plurality of insulating glass spheres 28. In this manner, the secondary insulating material 40 can be at least partially retained by the retaining outer surfaces 38 of the insulating glass spheres 28 to occupy the plurality of interstitial spaces 30, and substantially all of the interstitial volume 34. The retaining outer surface 38 can include a geometric pattern or various recesses 42 that holds at least a portion of the secondary insulating material 40 to the outer surface 32 of the insulating glass spheres 28. The retaining outer surface 38 can also include an adhesive 52 or tacky surface to which the secondary insulating material 40 adheres.

According to the various embodiments, as exemplified in FIGS. 2-14, the retaining outer surface 38 may be defined as a surface coating 50 that defines an adhesive 52 for adhering the secondary insulating material 40 to the insulating glass spheres 28. This adhesive 52 can be in the form of a solution or vaporized liquid that includes a binder 54 that can be applied via a jet spray 56 (exemplified in FIG. 12) or through a steam spray 58 (exemplified in FIG. 13) while the insulating glass spheres 28 are rotated within a rotating drum 60. The formation of the retaining outer surface 38 modifies each of the insulating glass spheres 28 to have an external surface 62 that is more compatible to receive the secondary insulating material 40.

According to the various embodiments, the secondary insulating material 40 can be any one of various materials. Such materials can include, but are not limited to, fumed silica, precipitated silica, granular aerogels, micro/nano insulating spheres, organic and/or inorganic insulating spheres, perlite, rice husk ash, glass fiber, other silica-based material, combinations thereof, and other similar insulating materials. This secondary insulating material 40 can also be combined with various opacifiers 70, such as carbon black, silicon carbide, titanium oxide, and other similar opacifiers 70. It is contemplated that the coating material 36 that forms the adhesive retaining outer surface 38 can be in the form of various organic and/or inorganic binders, tin oxide, and other similar binders 54 for forming a generally adhesive surface on the outer surface 32 of each of the insulating glass spheres 28.

Referring again to FIGS. 1-11, through the use of the retaining outer surface 38, better adherence of the secondary insulating material 40 can be achieved. Accordingly, the interstitial spaces 30 and interstitial volume 34 in general can be substantially filled with the secondary insulating material 40 by adhering to the retaining outer surface 38 formed by the binder 54. Minimally sized pores 80 having a diameter in a range of from approximately 0.1 microns to approximately 10 microns. Preferably, the pores 80 include a diameter of less than 1 micron. These sizes of pores 80 can be achieved within the insulating core material 10 by the combination of the insulating glass spheres 28, the coating material 36 and the secondary insulating material 40. This small size of pores 80 within the insulating core material 10 can decrease the gas conductivity to be less than 5 mw/mk in a pressure range of approximately 1 mbar to approximately 10 mbar. Accordingly, the total thermal conductivity of the insulating core material 10 in an at least partial vacuum can be in the range of from approximately 3 mw/mk to approximately 10 mw/mk under 10 mbar.

Referring again to FIGS. 1-11, it is contemplated that the insulating glass spheres 28 can include, but are not limited to, ceramic spheres, hollow spheres 90, solid spheres, microspheres, nanospheres, and other similar insulating sphere configurations. Where the insulating glass spheres 28 are hollow spheres 90, the hollow spheres 90 can include an outer wall 92 and an interior sphere cavity 94. It is contemplated that the interior sphere cavity 94 can be an at least partial vacuum or can be filled with an insulating gas.

Referring again to FIGS. 1-13, it is contemplated that during application of the coating material 36, the coating material 36 can be heated to form a vaporized material, such as a steam spray 58 that is injected, infused, sprayed or otherwise disposed on the outer surfaces 32 of the insulating glass spheres 28 within the rotating drum 60. The adhesion of the coating material 36 to the insulating glass spheres 28 serves to define a non-agglomerating mixture of the insulating glass spheres 28. The non-agglomeration of the insulating glass spheres 28 prevents the insulating glass spheres 28 from adhering to one another and forming large air pockets within agglomerates of coated insulating glass spheres 28 that a secondary insulating material 40 may not be able to reach. Through the non-agglomeration of the insulating glass spheres 28, the secondary insulating material 40 can be combined with the coated insulating glass spheres 28 to evenly mix with and fill the interstitial spaces 30 and interstitial volume 34 defined between the insulating glass spheres 28. It is also contemplated that the coating material 36 can be placed in fluid form. This fluid coating material 36 can be injected, infused, or otherwise disposed with the insulating glass spheres 28 within the rotating drum 60 via fluid jets 100 that place the coated material on the outer surfaces 32 of the insulating glass spheres 28. In this liquid form, it is contemplated that non-agglomeration of the insulating glass spheres 28 can be achieved. Accordingly, even mixing of the secondary insulating material 40 around the coated insulating glass spheres 28 can also be achieved to create minimally sized pores 80 between the insulating glass spheres 28 and the secondary insulating material 40.

Referring again to FIGS. 1-13, various aspects of the insulating core material 10 can include the plurality of the insulating glass spheres 28, each insulating glass sphere 28 defining an outer surface 32 that further defines the interstitial spaces 30 and the interstitial volume 34 defined between the plurality of insulating glass spheres 28. A textured surface 110 can be defined within the outer surface 32 of each insulating glass sphere 28. In such an embodiment, the textured surface 110 serves to define the retaining outer surface 38 in the form of a retaining mechanism 112 of each insulating glass sphere 28 of the plurality of insulating glass spheres 28. The secondary insulating material 40 can be combined with the plurality of insulating glass spheres 28 having the retaining mechanism 112. It is contemplated that the secondary insulating material 40 is at least partially retained by the retaining mechanism 112 of the insulating glass spheres 28 to occupy the plurality of interstitial spaces 30. According to various embodiments, the retaining mechanism 112 of each insulating glass sphere 28 can include a plurality of recesses 42 defined within the outer surfaces 32 of each of the insulating glass spheres 28.

Referring again to FIGS. 1-13, it is contemplated that the recesses 42 can be defined within an outer surface 32 of the insulating glass sphere 28. Where the insulating glass sphere 28 is a hollow glass sphere having an outer wall 92 and an interior sphere cavity 94, it is contemplated that the recesses 42 can extend through at least a portion of the outer wall 92. In this manner, the interior sphere cavity 94 can be in communication with one or more of the interstitial spaces 30 and the interstitial volume 34 in general. Where the interior sphere cavity 94 is in communication with the interstitial volume 34, it is contemplated that the secondary insulating material 40 can occupy the interstitial spaces 30 and at least a portion of the interior sphere cavities 94 of the plurality of insulating glass spheres 28. Accordingly, where the recesses 42 are defined through the outer wall 92 of the hollow sphere 90, the secondary insulating material 40, during mixing of the various materials, can infiltrate into the interior sphere cavity 94. In this manner, the secondary insulating material 40 can occupy substantially all of the accessible air pockets and interstitial spaces 30 defined within and between the insulating glass spheres 28.

According to various embodiments, the formation of the retaining mechanism 112 defined within the insulating glass spheres 28 can be formed in various processes. Such processes for forming the retaining mechanism 112 can include, but are not limited to, glass melting, grinding the glass into frits or ground glass particles, expanding the various insulating glass spheres 28, leaching or etching the insulating glass spheres 28. After formation of the retaining mechanism 112 through the various processes applied to the insulating glass spheres 28, the various retaining mechanisms 112 can be dried and then mixed with various secondary insulating materials 40 that can include, but are not limited to, fumed silica, precipitated silica, granular aerogels, micro/nano insulating spheres, organic and/or inorganic insulating spheres, perlite, rice husk ash, glass fiber, other silica-based material, combinations thereof, and other similar insulating materials. As discussed above, these insulating materials can be mixed with various opacifiers 70 that can include, but are not limited to, carbon black, silicon carbide, titanium oxide and other similar opacifiers 70.

Referring again to FIGS. 2-13, where the textured surfaces 110 of the insulating glass spheres 28 and/or ceramic spheres is generated, various etched recesses 42 can be formed by mixing the insulating glass spheres 28 with a coating material 36, such as boiling water, that can be either ionized or deionized. In this manner, etched recess 42 can also be defined through a coating material 36 in the form of an acid solution, where such acid solution can include various acids and various concentrations of acids that can include hydrochloric acid. Other etching solutions 104 or combinations of the above described etching solutions 104 also be used to form the etched recesses 42. The result of the etching processes is a retaining mechanism 112 in the form of a porous textured surface 110 defined within the outer surfaces 32 of the various insulating glass spheres 28. These etched recesses 42 can retain a portion of the secondary insulating material 40 that can serve to modify the overall external surface 62 of each insulating glass sphere 28. Accordingly, gaseous pores 80 defined within the interstitial spaces 30 and the interstitial volume 34 can be kept to a minimum. The alteration of the outer surface 32 of the insulating glass spheres 28 to define the etched recesses 42 provides pores 80 that can be sized within a magnitude of angstroms or nanometers and that provide an anchor for the secondary insulating material 40 to latch onto and into. The etched recesses 42, in this manner, lead to full coverage of the outer surface 32 of each insulating glass sphere 28 by the secondary insulating material 40. It is also contemplated that the insulating glass spheres 28 can be dipped, submerged or otherwise disposed within the etching solution 104 to define the etched recesses 42 of the retaining mechanism 112. Typically, such a dipping process can occur outside of the rotating drum 60, such as within a separate coating area. In such an embodiment, the coated insulating spheres 28 having the etched recesses 42 defined therein can be delivered to the rotating drum 60 to be combined with the secondary insulating material 40 to define the insulating core material 10.

Referring again to FIGS. 2-11, the etched recesses 42 that extend through the outer wall 92 of various hollow spheres 90 can provide a path for the secondary insulating material 40 to be inside of the interior sphere cavities 94 to reduce the gas conductivity inside of each of the insulating glass spheres 28. The etched recesses 42 can also create air pockets on the surface of each of the insulating glass spheres 28 to retain a binder 54 that helps the mixing process. According to various embodiments, the binder 54 can help in the mixing process to bond or otherwise adhere the secondary insulating material 40 to the insulating glass spheres 28.

During the formation of the retaining mechanism 112, the etched recesses 42 can be formed by disposing the etching solution 104, such as boiling water and/or acid solution, within a rotating drum 60 through use of the fluid jets 100 (exemplified in FIG. 12) or through the injection of a vaporized or steam based material into the rotating drum 60

Figure 13:
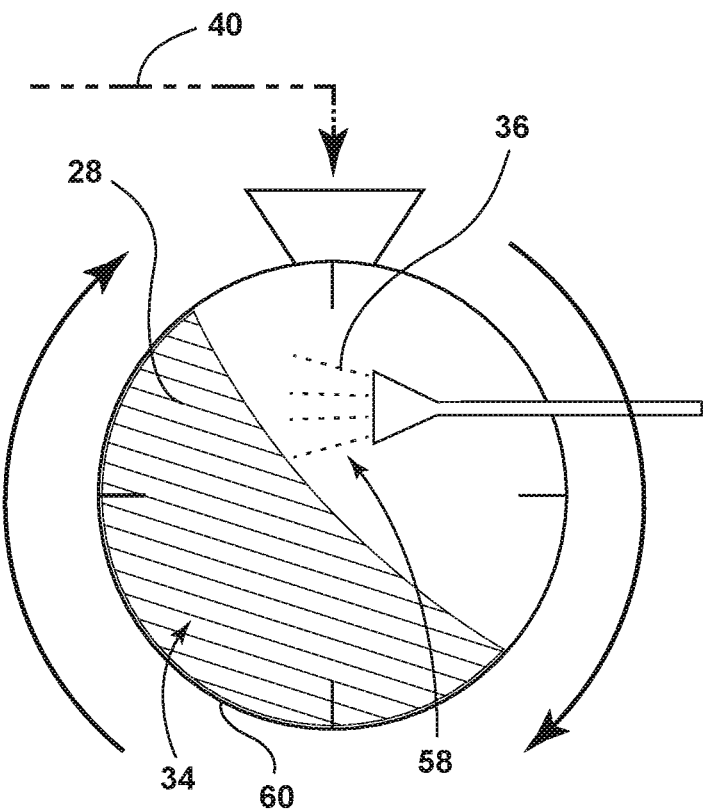
FIG. 13 is a schematic diagram illustrating an aspect of the rotating drum and spray nozzle for applying the coating material to the insulated glass spheres via a vaporized steam that is infused with the insulating glass spheres.
Figure 14:
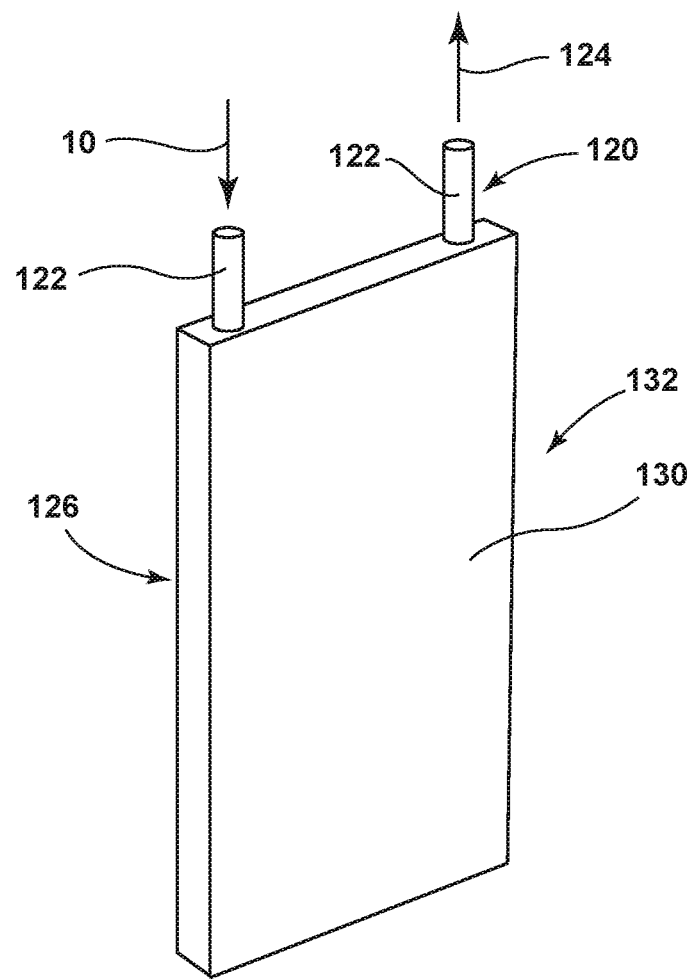
FIG. 14 is a schematic diagram illustrating an insulating envelope used to form a vacuum insulated panel having an aspect of the insulating core material disposed therein.
Figure 15:
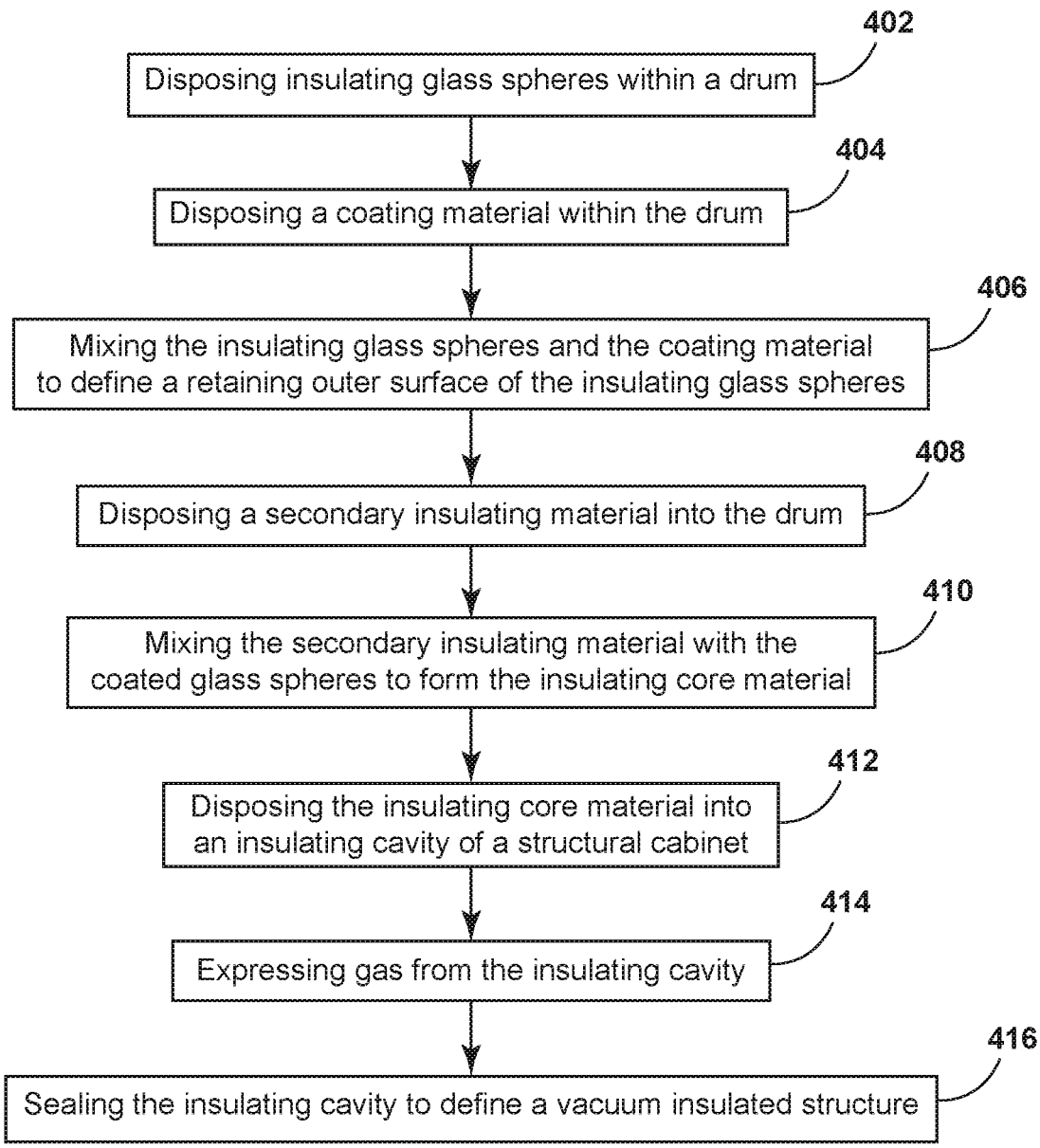
FIG. 15 is a schematic flow diagram illustrating an aspect of a method for forming an insulating core material for an appliance.
Figure 16:
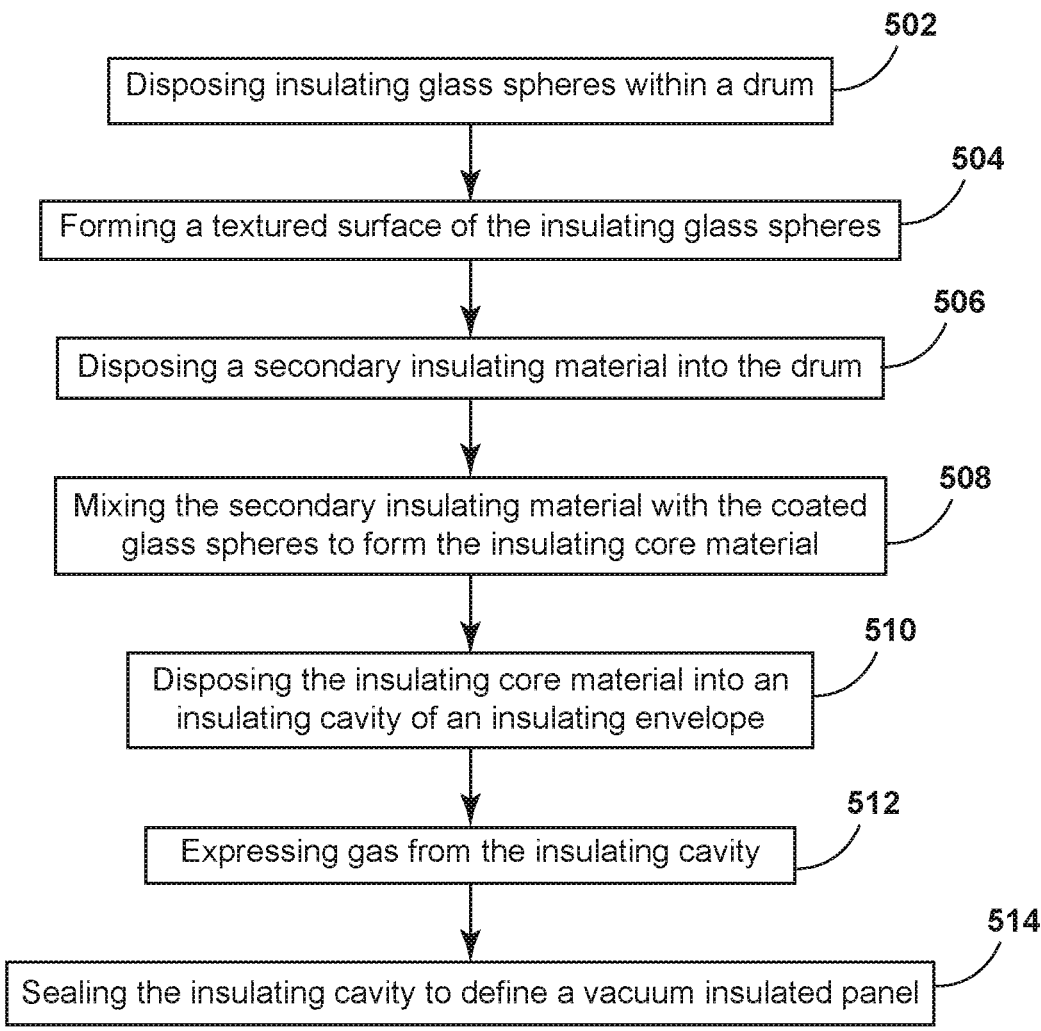
FIG. 16 is a schematic flow diagram illustrating a method for forming an insulating core material for an appliance.

(exemplified in FIG. 13). These techniques serve to coat each of the insulating glass spheres 28 to allow the etching operation to take place and to form the etched recesses 42 within the outer surface 32 of each of the insulating glass spheres 28. It is contemplated that the mixing duration and/or the acidity concentration of the acid solution or the heat of the boiling water can vary the size of the etched recesses 42 within the outer surface 32 of the insulating glass spheres 28. Different types of solution and different mixing durations can be used to create larger and/or smaller etched recesses 42 to accommodate the particular granular size of the secondary insulating material 40 used in conjunction with the insulating glass spheres 28. A secondary insulating material 40 having a larger particle size may require larger etched recesses 42 to properly receive the granules of the secondary insulating material 40. Conversely, a secondary insulating material 40 having a smaller granular size may be disposed within etched recesses 42 having a smaller size within the outer surface 32 of the insulating glass spheres 28.

According to the various embodiments, the insulating core material 10 using the coating material 36 and/or the textured surface 110 can substantially decrease the size of gaseous pores 80 defined between the insulating glass spheres 28 and the secondary insulating material 40. Such pores 80 can be reduced in size to approximately or less than approximately 1 micron. This serves to decrease the gas conductivity to be less than approximately 5 mw/mk in a range of from approximately 1 mbar to approximately 10 mbar. Due to the lower gas conductivity of the mixture having the insulating glass spheres 28 and the secondary insulating material 40, the insulating core material 10, placed under vacuum, can have a total thermal conductivity that is in the range of from approximately 3 mw/mk to approximately 10 mw/mk under 10 mbar.

Referring again to FIGS. 1-14, it is contemplated that the insulating core material 10 formed using the coating material 36 and/or textured surface 110 can be disposed into a three-dimensional insulating structure 120 using small ports 122 defined within the various wall structures of the structural cabinet 20. These ports 122 can then be used to draw gas 124 from the insulating cavity 12 of the structural cabinet 20 and an at least partial vacuum can be formed within the insulating cavity 12 of approximately 1 mbar.

Referring now to FIGS. 1-15, having described various aspects of the insulating core material 10, a method 400 is disclosed for forming the insulating core material 10 for an appliance 14. According to the method 400, a plurality of insulating glass spheres 28 can be disposed within a drum 60 (step 402). A coating material 36 can then be disposed in the drum 60 (step 404). The drum 60 can then be rotated to mix the plurality of insulating glass spheres 28 and the coating material 36 to modify the outer surface 32 of the insulating glass spheres 28 to define a retaining outer surface 38 of each insulating glass sphere 28 (step 406). After formation of the retaining outer surface 38, the secondary insulating material 40 can be disposed into the drum 60 (step 408). The secondary insulating material 40 is then mixed with the insulating glass spheres 28 having the retaining outer surfaces 38 (step 410). As discussed above, the secondary insulating material 40 is thereby retained by the retaining outer surfaces 38 to define the insulating core material 10 having minimally sized gaseous pores 80 along the size of approximately 1 micron.

Referring again to FIGS. 1-15, according to the various embodiments of the method 400, the insulating core material 10 can then be disposed into an insulating cavity 12 of a structural cabinet 20 (step 412) or other structural envelope. Gas 124 can be expressed from the insulating cavity 12 to define an at least partial vacuum within the insulating cavity 12 (step 414). The structural cabinet 20 can then be sealed to define a vacuum insulated structure 126, such as a vacuum insulated cabinet or vacuum insulated panel 132, with the insulating core material 10 disposed therein (step 416).

According to the various embodiments, where the insulating core material 10 is sufficiently dense, a vacuum, or at least partial vacuum, may not need to be pulled in order to achieve the desired thermal conductivity within the insulating cavity 12 and within the insulating core material 10. It is also contemplated that the insulating core material 10 made through the various processes described herein can be sufficiently dense such that inward vacuum bow as a result of drawing gas 124 from the insulating cavity 12 can be minimized. Accordingly, the insulating core material 10 includes sufficient structure, such that it can resist the inward forces generated by the pressure differential between the exterior of the structural cabinet 20 and the at least partial vacuum within the insulating cavity 12. By resisting inward or vacuum bow, the thickness of the vacuum insulated structure 126 can remain substantially consistent during formation of the vacuum insulated structure 126 and during use of the vacuum insulated structure 126.

Referring now to FIGS. 1-14 and 16, a method 500 is disclosed for forming an insulating core material 10 for an appliance 14. According to the method 500, insulating glass spheres 28 are disposed within the drum 60 (step 502). The textured surface 110 can be defined within the outer surface 32 of each insulating glass sphere 28, thereby creating a retaining mechanism 112 with respect to each insulating glass sphere 28 (step 504). It is contemplated that the textured surface 110 can be formed through a coating material 36 being added to the insulating glass spheres 28. Where the textured surface 110 includes the etched recesses 42, the coating material 36 can include an etching solution 104 such as boiling water and/or an acid solution. The etching solution 104 serves to at least partially erode the outer surface 32 of the insulating glass spheres 28 to define the etched recesses 42 therein.

After forming the textured surface 110, the secondary insulating material 40 can be disposed within the drum 60 (step 506). The secondary insulating material 40 can then be mixed with the insulating glass spheres 28 having the retaining mechanism 112 (step 508). It is contemplated that the secondary insulating material 40 is thereby retained by the retaining mechanism 112 to define an insulating core material 10 (step 508). As discussed above, the retaining mechanism 112 can be defined by the various etched recesses 42 extending into or potentially through an outer wall 92 of a hollow sphere 90 such that the secondary insulating material 40 can be retained within the etched recesses 42 and also within the interior sphere cavities 94 of the various insulating glass spheres 28.

Referring again to FIGS. 1-14 and 16, the method 500 can also include disposing the insulating core material 10 into an insulating cavity 12 of an insulating envelope 130 or other insulating structure 120 (step 510). Gas 124 can then be expressed from the insulating cavity 12 to define an at least partial vacuum within the insulating envelope 130 (step 512). The insulating envelope 130 can then be sealed to define a vacuum insulated panel 132 (step 514). The vacuum insulated panel 132 can then be disposed within an insulating cavity 12 as an insulating member for the structural cabinet 20 of the appliance 14. It is contemplated that the vacuum insulated panel 132 can be combined with additional amounts of the insulating core material 10 to fully occupy the insulating cavity 12 of the structural cabinet 20.

According to the various embodiments, the insulating core material 10 can be made according to the various processes and to have the various structures defined herein, based upon the various factors related to the appliance 14. Such factors can include, but are not limited to, the size of the appliance 14, the thickness of the various walls of the structural cabinet 20, the desired level of thermal conductivity, combinations thereof, and other similar factors.

According to the various embodiments, composites of various insulating core materials 10 can be combined, such that a particular insulating core material 10 can be formed through one process and then can be mixed with a separate insulating core material 10 formed through a separate process to achieve a composite insulating core material 10 having various intermingled characteristics.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulating core material for a refrigerating appliance, the insulating core material comprising:
   a plurality of insulating glass spheres, wherein a plurality of interstitial spaces are defined between at least a portion of the insulating glass spheres of the plurality of insulating glass spheres;
   a coating material applied at least to an outer surface of each insulating glass sphere of the plurality of insulating glass spheres, wherein the coating material includes ground particles of glass spheres that are adhered to the plurality of insulating glass spheres, wherein the coating material modifies the outer surface to define a retaining outer surface of each insulating glass sphere of the plurality of insulating glass spheres; and
   a secondary insulating material combined with the plurality of insulating glass spheres, wherein the secondary insulating material is at least partially retained by the retaining outer surfaces of the plurality of insulating glass spheres to occupy the plurality of interstitial spaces.

2. The insulating core material of claim 1, wherein the retaining outer surface includes a surface coating that defines an adhesive for adhering the secondary insulating material to the plurality of insulating glass spheres.

3. The insulating core material of claim 1, wherein the secondary insulating material includes a silica-based material.

4. The insulating core material of claim 1, wherein the secondary insulating material includes tin oxide.

5. The insulating core material of claim 1, wherein the coating material includes an organic binder.

6. The insulating core material of claim 1, wherein the secondary insulating material includes at least one of fumed silica, precipitated silica, granular aerogels, organic insulating spheres, inorganic insulating spheres, perlite, rice husk ash and glass fiber.

7. The insulating core material of claim 1, wherein the secondary insulating material includes an opacifier that includes at least one of carbon black, silicon carbide and titanium oxide.

8. The insulating core material of claim 1, wherein the coating material includes at least one of an organic binder, an inorganic binder and tin oxide.

9. The insulating core material of claim 1, wherein the plurality of insulating glass spheres includes at least one of ceramic spheres, hollow spheres, solid spheres, microspheres and nanospheres.

10. An insulating core material for a refrigerating appliance, the insulating core material comprising:

a plurality of insulating glass spheres, each insulating glass sphere of the plurality of insulating glass spheres defining an outer surface, wherein the outer surface of each insulating glass sphere defines a plurality of interstitial spaces;

a textured surface defined within the outer surface of each insulating glass sphere, wherein the textured surface defines a retaining mechanism of each insulating glass sphere of the plurality of insulating glass spheres wherein the retaining mechanism is defined by ground particles of glass spheres that are adhered to the plurality of insulating glass spheres; and a secondary insulating material combined with the plurality of insulating glass spheres, wherein the secondary insulating material is at least partially retained by the retaining mechanism of the insulating glass spheres to occupy the plurality of interstitial spaces.

11. The insulating core material of claim 10, wherein the insulating glass spheres are hollow glass spheres having an outer wall and an interior sphere cavity.

12. The insulating core material of claim 10, further comprising:

a binder that defines an adhesive that further bonds the secondary insulating material to the insulating glass spheres.

13. The insulating core material of claim 10, wherein the secondary insulating material includes a silica-based material.

14. The insulating core material of claim 10, wherein the secondary insulating material includes tin oxide.

15. The insulating core material of claim 10, wherein the secondary insulating material includes at least one of fumed silica, precipitated silica, granular aerogels, organic insulating spheres, inorganic insulating spheres, perlite, rice husk ash and glass fiber.

16. The insulating core material of claim 10, wherein the secondary insulating material includes an opacifier that includes at least one of carbon black, silicon carbide and titanium oxide.

17. The insulating core material of claim 10, wherein a coating material is used to adhere the ground particles of the glass spheres, and wherein the coating material includes at least one of an organic binder, an inorganic binder and tin oxide.

18. The insulating core material of claim 10, wherein the plurality of insulating glass spheres includes at least one of ceramic spheres, hollow spheres, solid spheres, microspheres and nanospheres.

* * * * *